United States Patent
Saruwatari et al.

(10) Patent No.: US 6,775,718 B2
(45) Date of Patent: Aug. 10, 2004

(54) DMA CONTROL SYSTEM ENABLING FLYBY TRANSFER TO SYNCHRONOUS MEMORY

(75) Inventors: Toshiaki Saruwatari, Kawasaki (JP); Atsushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 09/933,765

(22) Filed: Aug. 22, 2001

(65) Prior Publication Data

US 2002/0138672 A1 Sep. 26, 2002

(30) Foreign Application Priority Data

Mar. 26, 2001 (JP) ........................................ 2001-087560

(51) Int. Cl.⁷ .............................................. G06F 13/28

(52) U.S. Cl. ............................. 710/25; 710/20; 710/58; 712/225; 711/111

(58) Field of Search ............................ 710/1, 7, 20, 22, 710/24, 25, 28, 31, 36, 58, 61; 712/225; 713/600; 711/105, 111, 113, 167

(56) References Cited

U.S. PATENT DOCUMENTS

| | | | | |
|---|---|---|---|---|
| 5,548,794 A | * | 8/1996 | Yishay et al. | 710/51 |
| 5,796,690 A | * | 8/1998 | Kanno | 369/48 |
| 5,813,024 A | * | 9/1998 | Saito | 711/113 |
| 5,950,225 A | * | 9/1999 | Kleiman | 711/111 |
| 6,049,844 A | * | 4/2000 | Matsui et al. | 710/104 |
| 6,219,724 B1 | * | 4/2001 | Kim et al. | 710/22 |
| 6,226,755 B1 | * | 5/2001 | Reeves | 713/400 |
| 6,243,797 B1 | * | 6/2001 | Merritt | 711/167 |
| 6,490,638 B1 | * | 12/2002 | Ha et al. | 710/15 |
| 6,662,258 B1 | * | 12/2003 | Lukanc et al. | 710/308 |

* cited by examiner

Primary Examiner—Jeffrey Gaffin
Assistant Examiner—RiJue Mai
(74) Attorney, Agent, or Firm—Staas & Halsey LLP

(57) ABSTRACT

A direct memory access control system supplies the respective status signals indicating timings of the read data effective state or writable state between the input/output interface and memory interface, both interfaces maintain the read data effective state and writable state of the input/output memory and synchronous memory under control until the later timing comes up. Consequently, it is possible to match the read data effective timing and writable timing of the synchronous memory and input/output memory, thus making possible flyby transfer of data between both memories.

20 Claims, 17 Drawing Sheets

FIG. 9    IO -> SDRAM DMA Transfer(Conventional)

FIG. 13

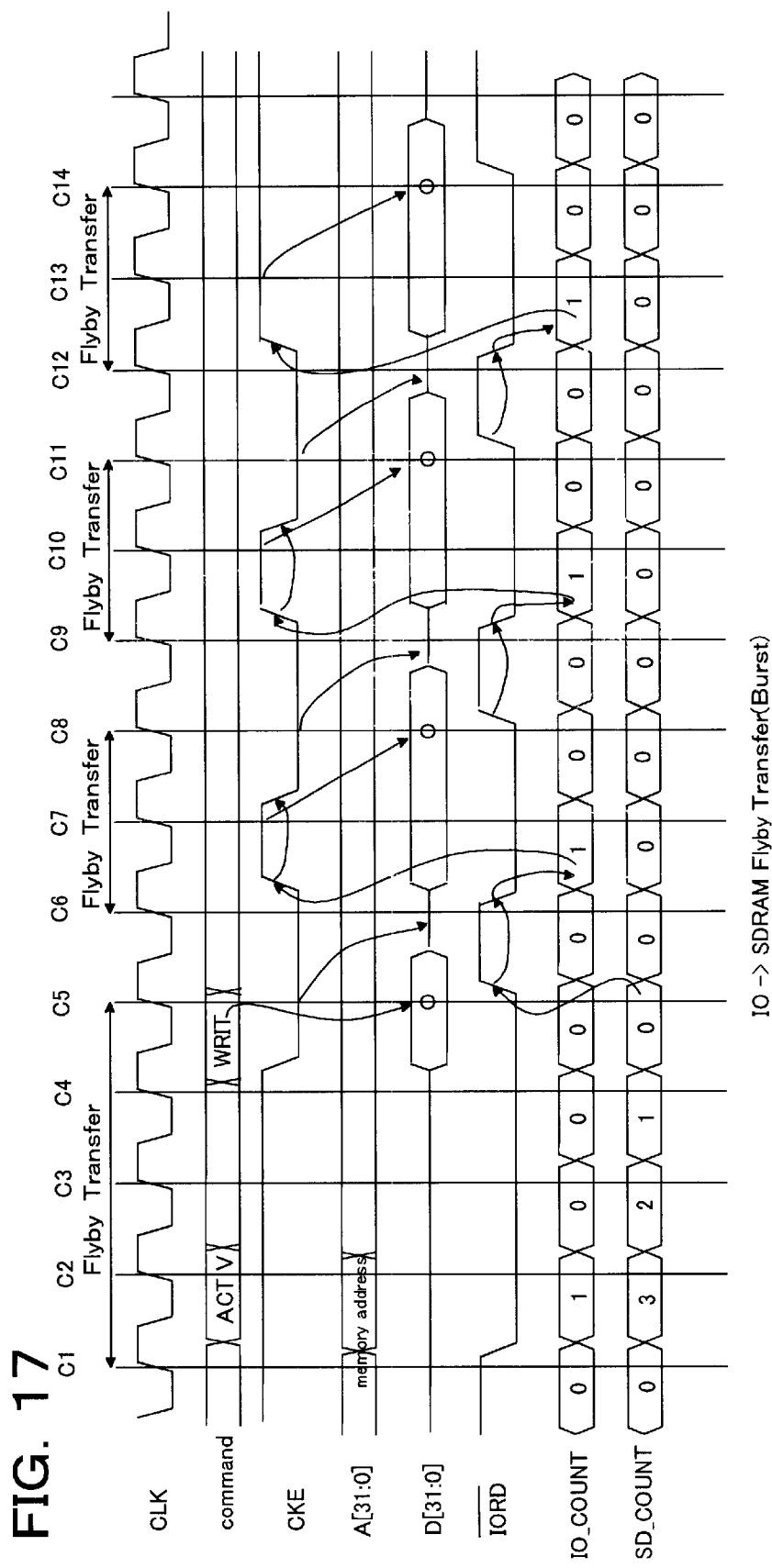

DMA CONTROL SYSTEM ENABLING FLYBY TRANSFER TO SYNCHRONOUS MEMORY

BACKGROUND OF THE INVENTION

1. Field of the Invention

The present invention relates to a DMA control system enabling flyby transfer between synchronous memory such as SDRAM (synchronous dynamic random access memory) and an external device.

2. Description of the Related Art

A microprocessor contains a CPU core, and a direct memory access controller (DMAC) internally; the DMAC controls access to an externally connected memory. For example, data transfer between the external memory and an external device is performed in that data stored in external memory is read and transferred to the external device, or data is read from the external device and transferred to the external memory.

In a typical method for such data transfer, data is read from the external memory, the read data is stored temporarily in an internal buffer of the microprocessor, and then the data stored in the internal buffer is transferred to the external device. Further, a data reading request is made to the external device, the read data is stored temporarily in the internal buffer, and then that data is written to the external memory.

FIG. 1 is a diagram showing the relationship between the microprocessor containing the DMAC, the external memory, and the external device. The microprocessor 10 is connected via a universal bus 22 to synchronous memory (SDRAM) 24 and an external device control unit 26. The external device control unit 26 includes an input/output memory 28 and controls access to the external device 30 such as a hard disk or communications device, or the like. The microprocessor 10 includes a CPU core 14, DMAC 16, and an I/O memory interface 18 for controlling the input/output memory 28, and an SDRAM interface 14 for controlling the SDRAM 24. These are each connected via the internal bus 12. Also, the microprocessor 10 includes an I/O internal buffer memory 20 for temporarily storing the data read from the I/O memory 28 in the external device control unit 26, and an SDRAM internal buffer 16 for temporarily storing data read from the SDRAM 24.

The CPU core 14 in the microprocessor 10 sends data transfer requests to the DMAC, first to read data from the SDRAM 24, which is the external memory, and supply the data to the external device 30, and secondly to take data from the external device 30 and write the data to the external memory SDRAM 24.

In the abovementioned first case, the DMAC 16 issues a read command to the SDRAM interface 14; the SDRAM interface 14 reads data by supplying the read command to the SDRAM 24, and stores the data temporarily in the SDRAM internal buffer 16. Thereafter, DMAC 16 issues an I/O write command to the I/O memory interface 18. The I/O memory interface 18 supplies the write command to I/O memory 28 and writes the data stored in the SDRAM internal buffer 16.

In the abovementioned second case, conversely, the DMAC 16 causes the I/O memory interface 18 to execute an I/O read, reads data in the I/O memory 28, and stores the data temporarily in the I/O internal buffer 20. Thereafter, a write command is supplied from the SDRAM interface 14 to the SDRAM 24 and the stored data is thus written thereto.

Consequently, for data transfer between SDRAM 24 which is the external memory and the I/O memory 28, operations to access each memory are necessary; a total of two access operation cycles are required. Moreover, this causes the system processing to become less efficient because the universal bus 22 is monopolized in each of the operation cycles.

Flyby transfer between the I/O memory 28 of the external device 30 and the SDRAM 24 is desirable. In flyby transfer, data is transferred between the device 24 and 28 directly via the universal bus 22. However, although the external device 30 can control the data effective period to a certain extent by asserting read/write commands, the cycle wherein the input/output data is effective in synchronous memory such as SDRAM is only one cycle at a predetermined timing within the command cycle because of the high-speed operations of the memory. It is therefore difficult to control data transfer through conforming to that input/output data effective cycle.

SUMMARY OF THE INVENTION

It is an object of the present invention to provide a DMA control system which enables flyby transfer for directly transferring data between a synchronous memory and an I/O memory of an external device.

In order to achieve the abovementioned object, a first aspect of the present invention is a direct memory access control system including: a direct memory access controller for issuing a flyby transfer command; a memory interface for receiving the flyby transfer command and supplying a first access command to an external synchronous memory; and an input/output interface for supplying a second access command to an external input/output memory. The input/output interface supplies a first status-signal indicating a writable timing or a read data effective timing of the input/output memory to the memory interface. The memory interface supplies a second status signal, that indicates a read data effective timing or a writable timing corresponding to the access command supplied to the synchronous memory, to the input/output interface. Until the later of the timings indicated by the first and second status signals, the memory interface and the input/output interface maintain a read data effective state and a writable state respectively.

According to the abovementioned invention, while supplying the respective status signals indicating timings of the read data effective state or writable state between the input/output interface and memory interface, both interfaces maintain the read data effective state and writable state of the input/output memory and synchronous memory under control until the later timing comes up. Consequently, it is possible to match the read data effective timing and writable timing of the synchronous memory and input/output memory, thus making possible flyby transfer of data between both memories.

In a preferred embodiment of the abovementioned invention, the memory interface extends the read data effective state by negating a clock enable signal for controlling a clock input to the synchronous memory. In effect, the memory interface extends the read data effective state by maintaining the state of negating the clock enable signal until the timing of the first status signal. Also, the memory interface supplies a write command, for instructing writing to the synchronous memory, to the synchronous memory in accordance with the timing of the first status signal.

In a preferred embodiment of the abovementioned invention, the input/output interface maintains the state of asserting the read signal to the input/output memory until the timing of the second status signal. Also, the input/output interface maintains the state of asserting the write signal to the input/output memory until the timing of the second status signal.

Furthermore, in a preferred embodiment of the above-mentioned invention, the input/output interface counts the access cycles to the external device under control and outputs the first status signal when the count ends, or supplies the count value to the memory interface. Or, the input/output interface outputs the first status signal in response to a ready signal from the external device under control.

Furthermore, in a preferred embodiment of the above-mentioned invention, the memory interface counts the number of cycles, until the read data effective state or the writable state, of the synchronous memory under control and outputs the second status signal when that count ends, or supplies the count value to the input/output memory interface.

Furthermore, in a preferred embodiment of the above-mentioned invention, at a time of burst transfer for successively transferring data, the memory interface negates a clock enable signal for controlling clock input to the synchronous memory to maintain a state of completed setup for data input/output, and asserts the clock enable signal at the timing of the first status signal, to initiate the next input/output setup.

BRIEF DESCRIPTION OF THE DRAWINGS

FIG. 13 is a timing chart for burst transfer using flyby transfer from SDRAM to I/O memory, according to the present embodiment;

FIG. 17 is a timing chart of burst transfer operations in flyby transfer from I/O memory to SDRAM using the system of the modified example.

DESCRIPTION OF THE PREFERRED EMBODIMENTS

The preferred embodiments of the present invention are explained below with reference to the drawings. However, the scope of the present invention is not limited by the following embodiment examples and extends to the inventions appearing in the claims and to items equivalent thereto.

Figure 1:
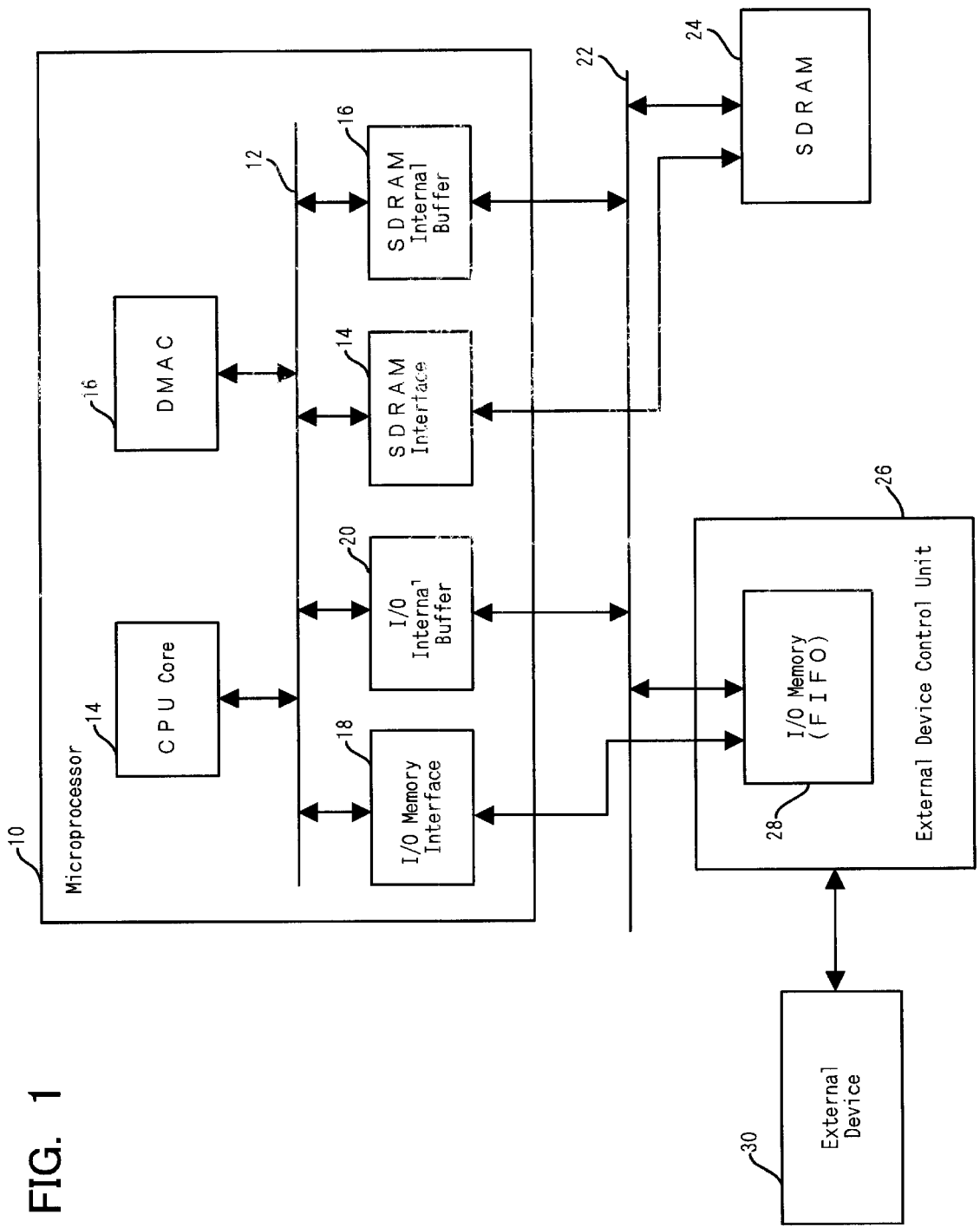
FIG. 1 is a diagram showing the relationship between the microprocessor containing the DMAC, external memory, and external device.
Figure 2:
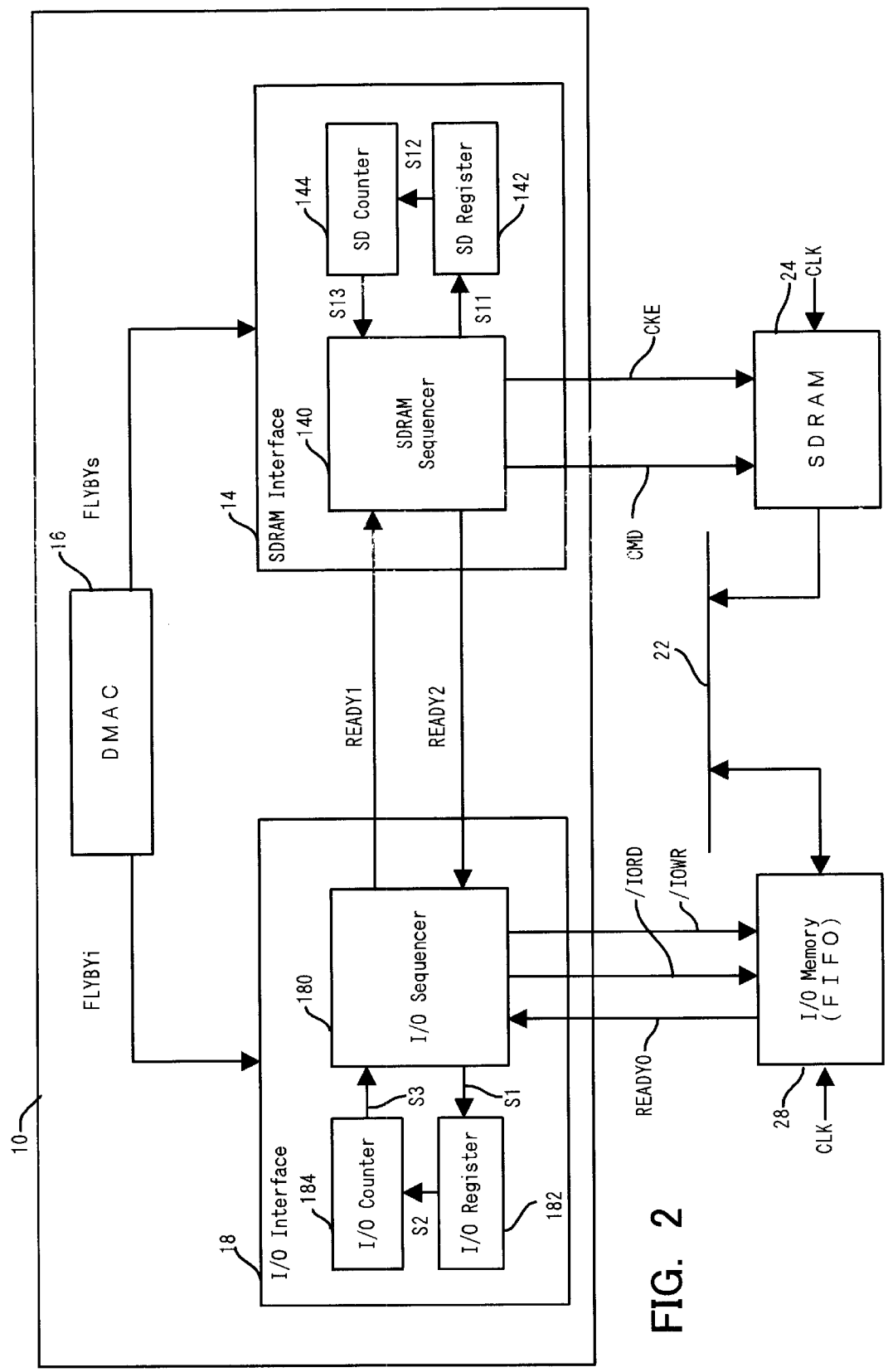
FIG. 2 is a diagram of the configuration of the DMA control system relating to the present embodiment.

FIG. 2 is a diagram of the configuration of the DMA control system relating to the present embodiment. The microprocessor 10 includes a CPU core, not shown, a direct memory access controller (DMAC) 16, SDRAM interface 14, and I/O interface 18. The SDRAM interface 14 controls the SDRAM 24 which is an external synchronous memory. Also, the I/O interface 18 controls the I/O memory 28 included in the control circuit, or the like, of an external device, not shown. The SDRAM 24 and I/O memory 28 are connected via an external universal bus 22.

The I/O sequencer 180 in the I/O interface 18 asserts the I/O read command (or I/O read signal) /IORD to the I/O memory 28 and reads the stored data to the universal bus 22; and asserts the I/O write command (I/O write signal) /IOWR to the I/O memory 28 and writes the data on the universal bus 22. The I/O memory 28 receives the requested data from the external device and stores the data in the I/O memory, and asserts the ready signal READY0 at the stage of output to the universal bus 22. In response thereto, the I/O sequencer 180 negates the I/O read command /IORD. Furthermore, at the stage where requested data can be fetched from the universal bus 22, the I/O memory 28 asserts the ready signal READY0 and in response thereto, the I/O sequencer 180 negates the I/O write command /IOWR.

Also, when the access cycle of the external device is fixed, the I/O sequencer 180 sets that access cycle in advance in the I/O register 182. When accessing the I/O memory 28, the I/O sequencer sets the set value S2 of the register 182 to the I/O counter 184 using the signal S1 and negates the I/O read command /IORD or the I/O write command /IOWR in response to the count end signal S3.

However, in the case where the flyby transfer command FLYBYi is put out from the DMAC 16, if the I/O sequencer 180 receives the ready signal READY0 from the I/O memory 28 without receiving the second ready signal READY2 from the SDRAM interface 14, the I/O sequencer 180 maintains the assertion state without negating the I/O read command /IORD or the I/O write command /IOWR until receiving the second ready signal READY2. When the second ready signal READY2 has already been received, the I/O sequencer 180 negates the I/O read command /IORD or the I/O write command /IOWR as usual in response to the reception of the ready signal READY0 or the count end signal S3.

Figure 3:
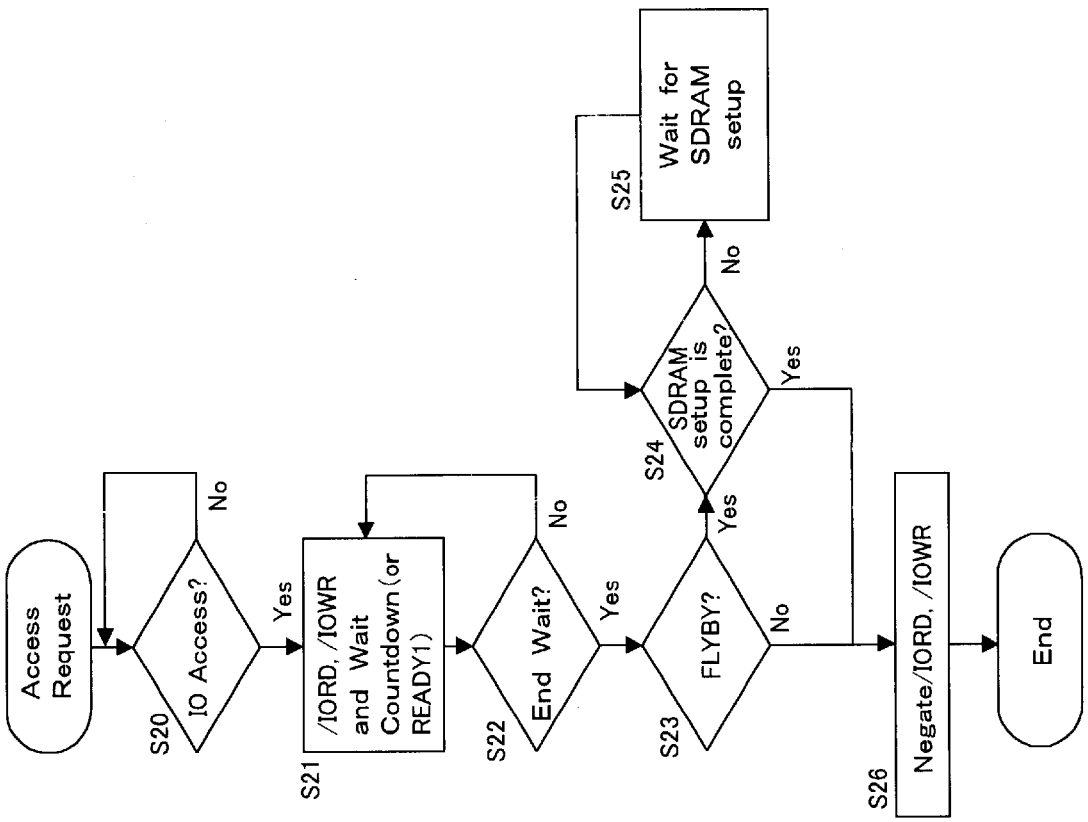
FIG. 3 is a flowchart for the operations of the I/O sequencer.

FIG. 3 is a flowchart for the operations of the I/O sequencer. Upon receiving the I/O access request from the DMAC 16 (S20), the I/O sequencer 180 asserts the I/O read or I/O write command /IORD, /IOWR and waits for the end of the countdown, or waits to receive the ready signal READY0 from the I/O memory 28 (S21, S22). Once the waiting state has ended, in the case of a flyby transfer command (S23), if the I/O sequencer receives the second ready signal READY2 indicating that SDRAM setup is complete (S24), the sequencer immediately negates the I/O read or I/O write command /IORD, /IOWR (S26). If the I/O sequencer has not received the second ready signal READY2, the I/O sequencer maintains the command assertion state until that signal is received (S25). In response to receiving the second ready signal, the I/O sequencer negates the I/O read or I/O write command /IORD, /IOWR (S26).

When there is a request to access the SDRAM, the sequencer 140 in the SDRAM interface 14 supplies commands CMD, comprising a combination of /RAS, /CAS, /CE, and /WE, to the SDRAM 24 and performs a read operation or write operation. In the case of SDRAM, the read operation and the write operation in an access operation are carried out with a combination of the following: "active" for activating a word line, "read" for reading data from a memory cell, "write" for writing data to a memory cell, and "precharge" for resetting a bit line. Consequently, the commands CMD include an active command, read command, write command, precharge command, and so forth. The SDRAM sequencer 140 supplies those commands in order and carries out the read operation and write operation. Also, the sequencer 140 supplies the clock enable CKE, for enabling and disabling the supply of the clock CLK into the SDRAM, to the SDRAM 24.

The SDRAM sequencer 140 controls the operation cycles of each command and supplies the abovementioned commands CMD in a predetermined order. For that reason, the number of operation cycles of each command is set in the register 142 and the operation cycle data S12 corresponding to a command is loaded to a counter 144 in response to an instruction signal S11. When the counter 144 ends the countdown, the count end signal S13 is supplied to the sequencer 140.

In the case of a read operation, the SDRAM 24 outputs the read data for a period of one clock cycle following CAS latency once the read command has been supplied. CAS latency is preset in the register 142 and the number of clock cycles from the read command until data output is fixed. However, when the clock enable CKE is negated, the internal operation of the synchronous memory can be stopped for the negation period without the clock being supplied therein.

Consequently, the SDRAM sequencer 140 can extend the time of the read data output effective state by appropriately negating the clock enable CKE. The SDRAM sequencer 140 therefore negates the clock enable CKE from before one clock cycle when read data is output, and in response to the first ready signal READY1 that is output when the I/O memory 28 completes input setup, asserts the clock enable CKE. Accordingly, during flyby transfer, the SDRAM sequencer 140 can output read data from the SDRAM 24 to the universal bus 22 at the timing corresponding to the I/O memory 28 operation speed.

Furthermore, in the write operation, the SDRAM 24 inputs the write data in the same clock cycle as the write command. Consequently, at the time of flyby transfer, the SDRAM sequencer 140 issues the write command in response to the first ready signal READY1, and can thereby match the fetch timing of the write data with the operation of the I/O memory 28.

Figure 4:
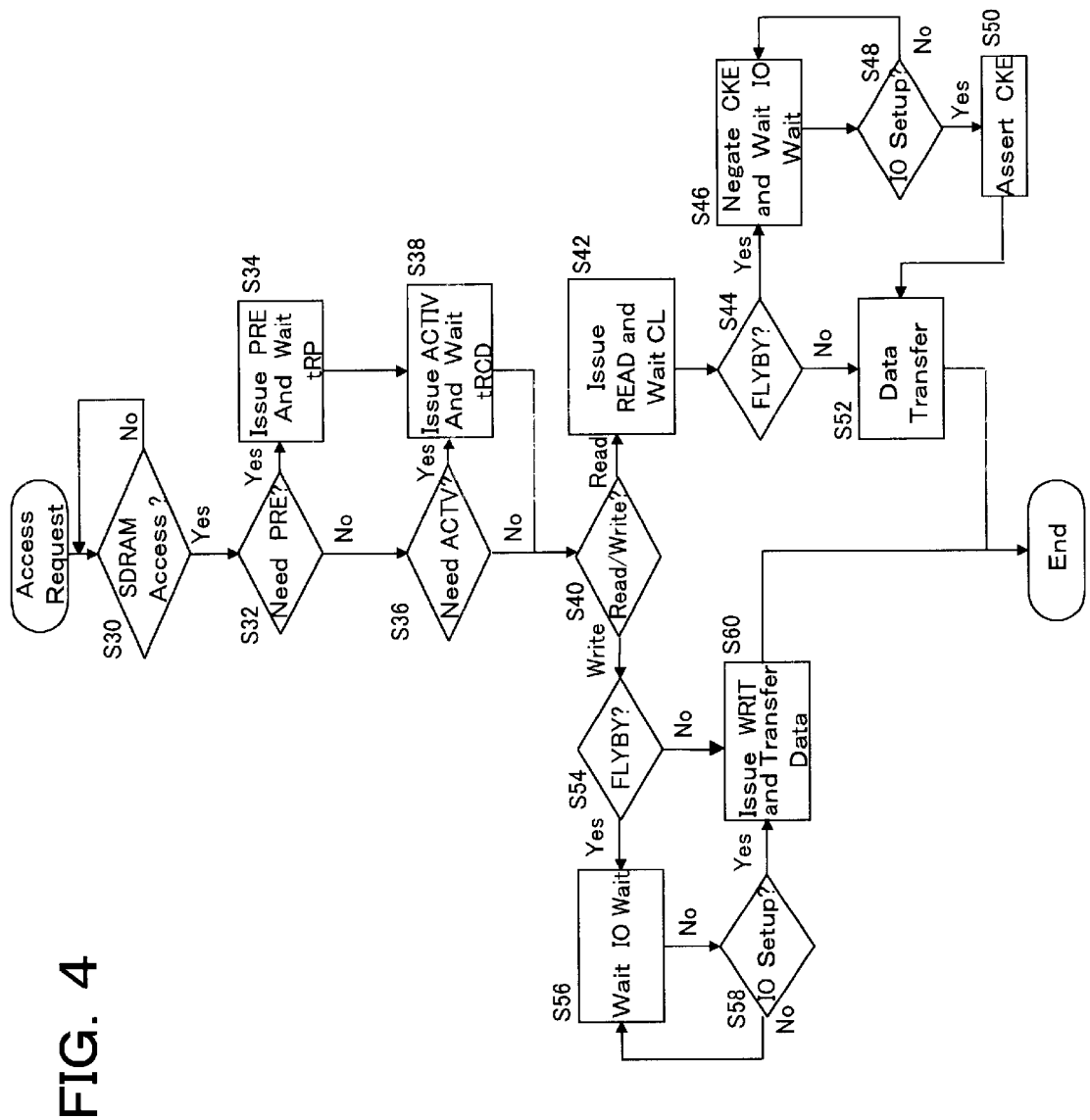
FIG. 4 is a flowchart for the SDRAM sequencer.

FIG. 4 is a flowchart for the SDRAM sequencer. When SDRAM access is issued (S30), the SDRAM sequencer 140 issues a precharge command PRE and an active command ACTV depending on the state of the SDRAM 24, and then issues the write command or read command. If the SDRAM 24 makes a page miss in the bank active state, it is necessary to perform reading or writing after the precharge PRE and active ACTV. Also, if the SDRAM 24 makes a page miss in the bank inactive state, it is necessary to perform reading or writing after the active ACTV.

In the case where precharging is necessary (S32), the SDRAM sequencer 140 issues the precharge command PRE and after waiting for the precharge clock cycle tRP (RAS precharge) (S34), issues the active command ACTV. Also, the SDRAM sequencer 140 issues the active command ACTV in the case where active is necessary (S36) or after the precharge, and waits for the active clock cycle tRCD (S38). Each clock cycle wait operation is performed by loading the set values in the register 142 to the counter 144 and initiating countdown.

In the case where the access request is a read operation, the SDRAM sequencer 140 issues the read command READ. In response thereto, the SDRAM 24 outputs the read data after the CAS latency CL clock cycle. However, in the case of flyby transfer (S44), the SDRAM sequencer 140 negates the clock enable CKE from one clock before the CAS latency CL clock cycle ends and waits until the I/O memory 28 setup ends (S46, S48). Upon receiving the first ready signal READY1 from the I/O sequencer 180 (S48), the SDRAM sequencer asserts the clock enable CKE in response thereto (S50), renews clock supply, and causes output of the read data to the universal bus 22 (S52).

In the case where the access request is a write operation, the SDRAM sequencer 140 issues a write command WRIT and causes the SDRAM 24 to fetch the write data in the universal bus 22 (S60). However, in the case of flyby transfer (S54), the sequencer waits until I/O memory 28 setup ends (S56, S58), and then issues the write command WRIT.

Next, the flyby transfer operation is explained for the cases where I/O memory is slower than SDRAM and where I/O memory is faster than SDRAM. Flyby transfer includes transfer from SDRAM to I/O memory and from I/O memory to SDRAM.

Flyby Transfer from SDRAM to I/O Memory (I/O Memory is Slower)

Figure 5:
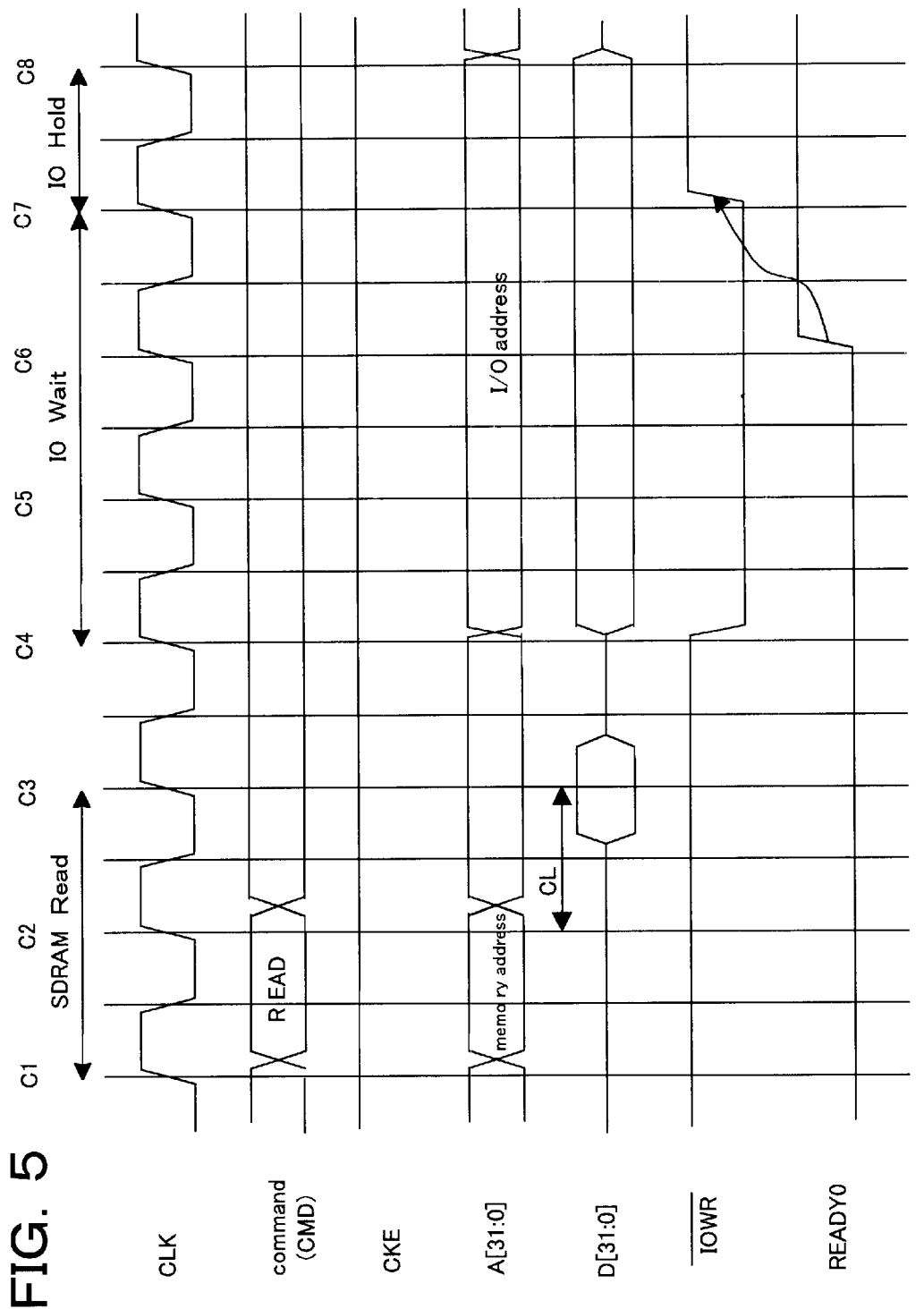
FIG. 5 is a timing chart for conventional transfer operations from SDRAM to I/O memory.

FIG. 5 is a timing chart for a conventional operation for transfer from SDRAM to I/O memory. Because flyby transfer could not be performed conventionally as discussed above, the DMAC 16 initially causes the SDRAM interface 14 to perform SDRAM read, temporarily stores the read data in an internal buffer, and then causes the I/O interface 18 to perform I/O write. The SDRAM sequencer 140 issues a read command READ, the SDRAM 24 fetches same at clock cycle C2 and outputs read data D at clock cycle C3 after CAS latency CL=1. As a result, the read data is stored in an internal buffer. Next, the I/O sequencer 180 asserts the I/O write signal /IOWR from clock cycle C4 and outputs a write command to the I/O memory 28. In response thereto, the I/O memory 28 asserts the ready signal READY0 at clock cycle C6, when the write setup is complete, whereupon I/O sequencer 180 detects this at clock cycle C7 and negates the I/O write signal /IOWR. In order to fetch data, the I/O memory 28 requires the write data D and address A during the I/O hold period of one clock cycle from the I/O write negation.

Figure 6:
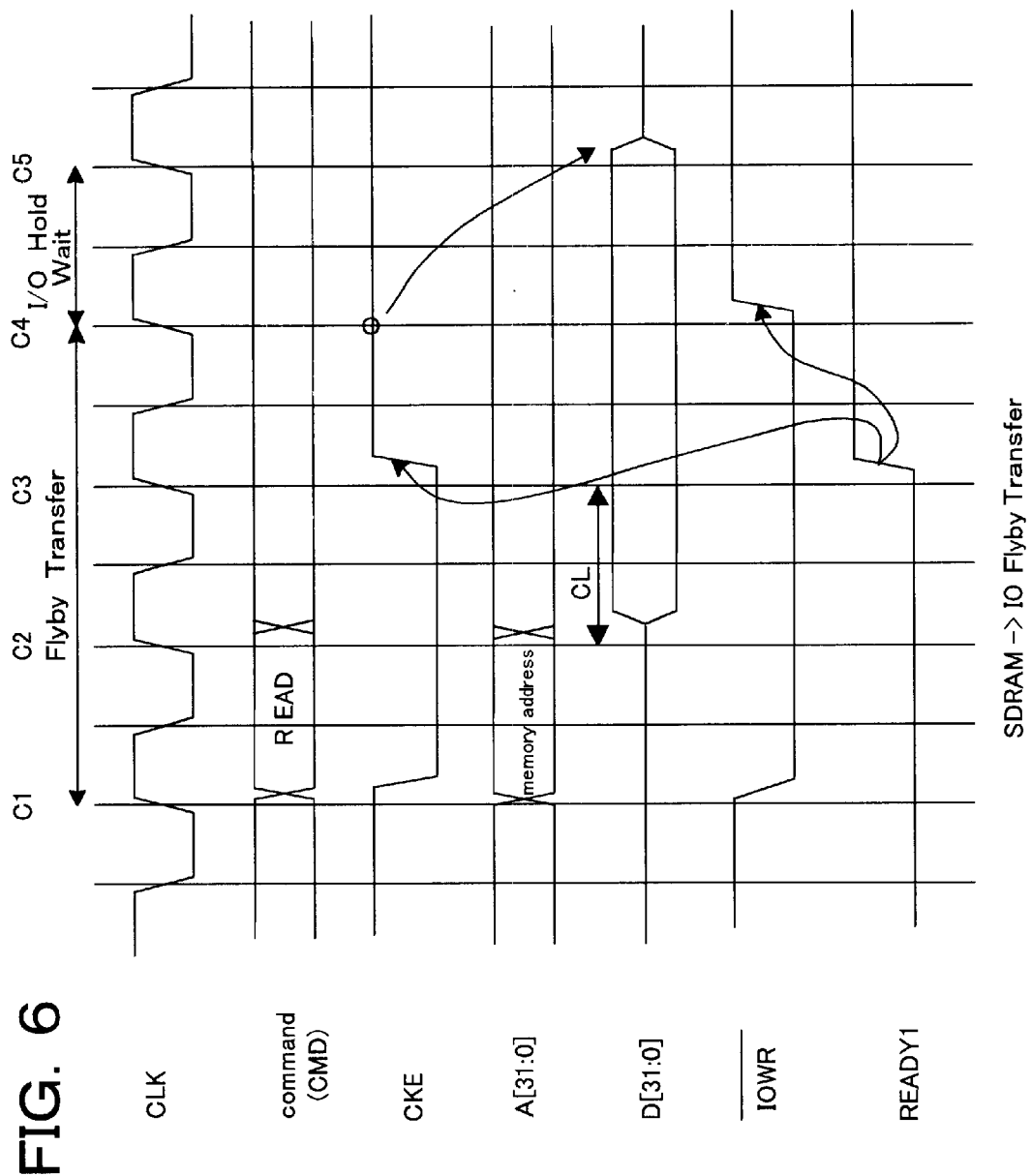
FIG. 6 is a timing chart for flyby transfer from SDRAM to I/O memory according to the present embodiment.

FIG. 6 is a timing chart of flyby transfer from SDRAM to I/O memory relating to the present embodiment. In this example, CAS latency CL is 1 and the SDRAM can operate from the read command. Initially, the DMAC 16 issues the flyby signals FLYBYi, FLYBYs to the I/O interface 18 and SDRAM interface 14 respectively. These flyby signals also include the direction of flyby transfer. In response thereto, the SDRAM sequencer 140 issues the read command READ to the SDRAM 24, and the I/O sequencer 180 asserts the I/O write signal /IOWR to I/O memory at clock cycle C1.

Since the CAS latency CL=1 in the example in FIG. 6, the SDRAM sequencer 140 negates the clock enable CKE at clock cycle C1 and exercises control so as to extend the read data output state. Shortly afterwards, when the I/O memory 28 setup is complete at clock cycle C3 and the I/O sequencer 180 asserts the first ready signal READY1, the SDRAM sequencer 140 asserts the clock enable CKE in response thereto. As a result, the SDRAM 24 maintains read data output during the one clock cycle from the rising edge of clock cycle C4. Consequently, the I/O hold period is established automatically and the I/O memory 28 can fetch the write data correctly.

Compared to FIG. 5, flyby transfer in FIG. 6 is completed in three clock cycles shorter than FIG. 5. Moreover, by using the clock enable CKE to extend the effective state of read data output for the SDRAM 24, a data hold is effected for one clock cycle automatically when the clock enable CKE is asserted in response to the negation of the I/O write signal/ IOWR.

Moreover, the I/O memory 28 having lower-speed operation requires the data hold period after the negation of the I/O write signal /IOWR. In the case of I/O memory 28 having higher-speed operation, this data hold period is not necessary. Consequently, the I/O interface 18 contains a register of whether data hold is necessary or not and notifies the SDRAM interface 14 via the DMAC.

Flyby Transfer from SDRAM to I/O Memory (SDRAM is Slower)

Figure 7:
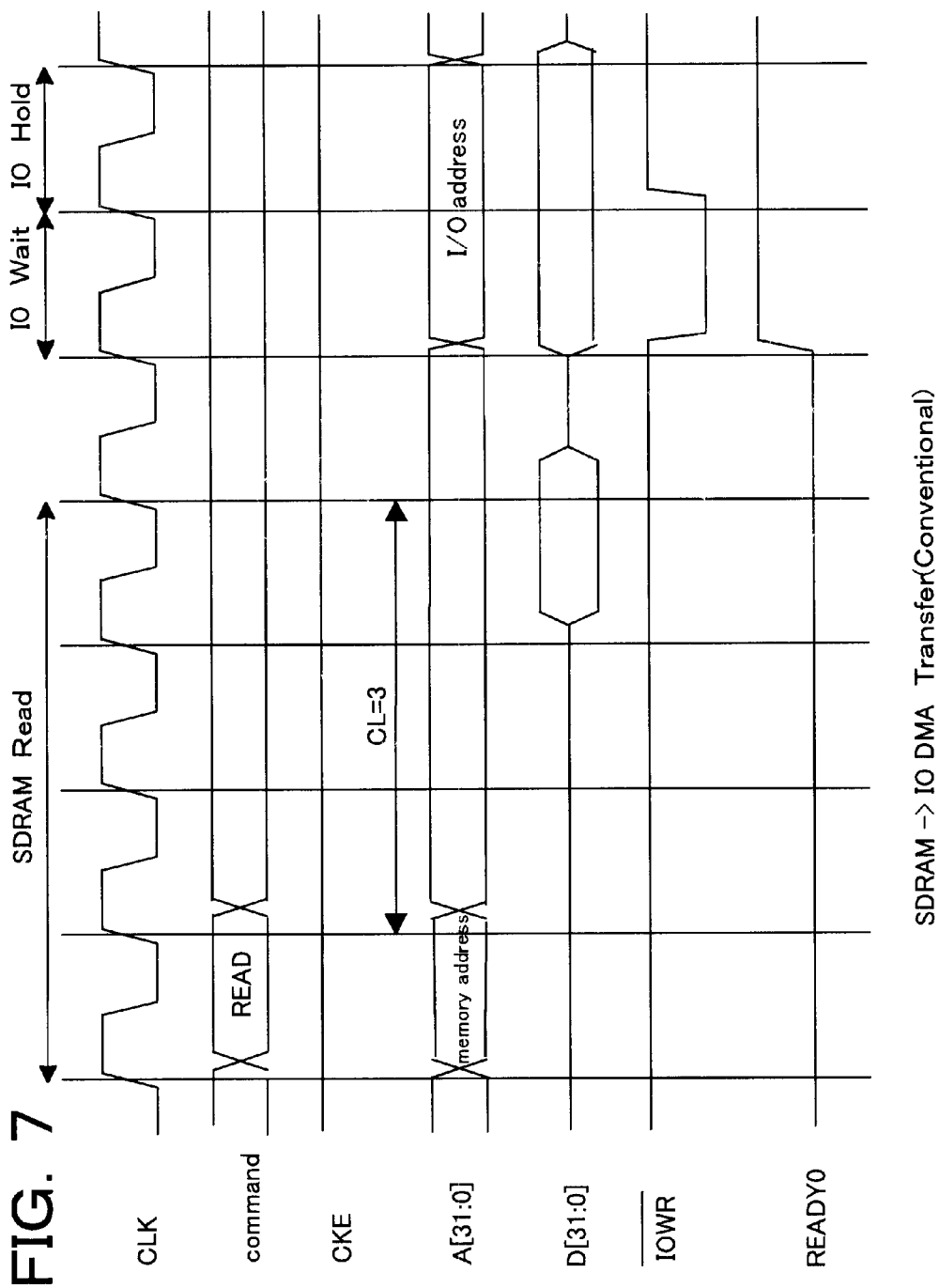
FIG. 7 is a timing chart for conventional transfer operations from SDRAM to I/O memory.

FIG. 7 is a timing chart of a conventional transfer operation from SDRAM to I/O memory in the case of slow SDRAM. The order of operations is the same as in the example in FIG. 5, but in the example in FIG. 7, the operation of the I/O memory is complete in two clock cycles while the CAS latency CL of the SDRAM is long, 3. Otherwise, the operations are the same as in FIG. 5 and a detailed explanation of the operations is omitted.

Figure 8:
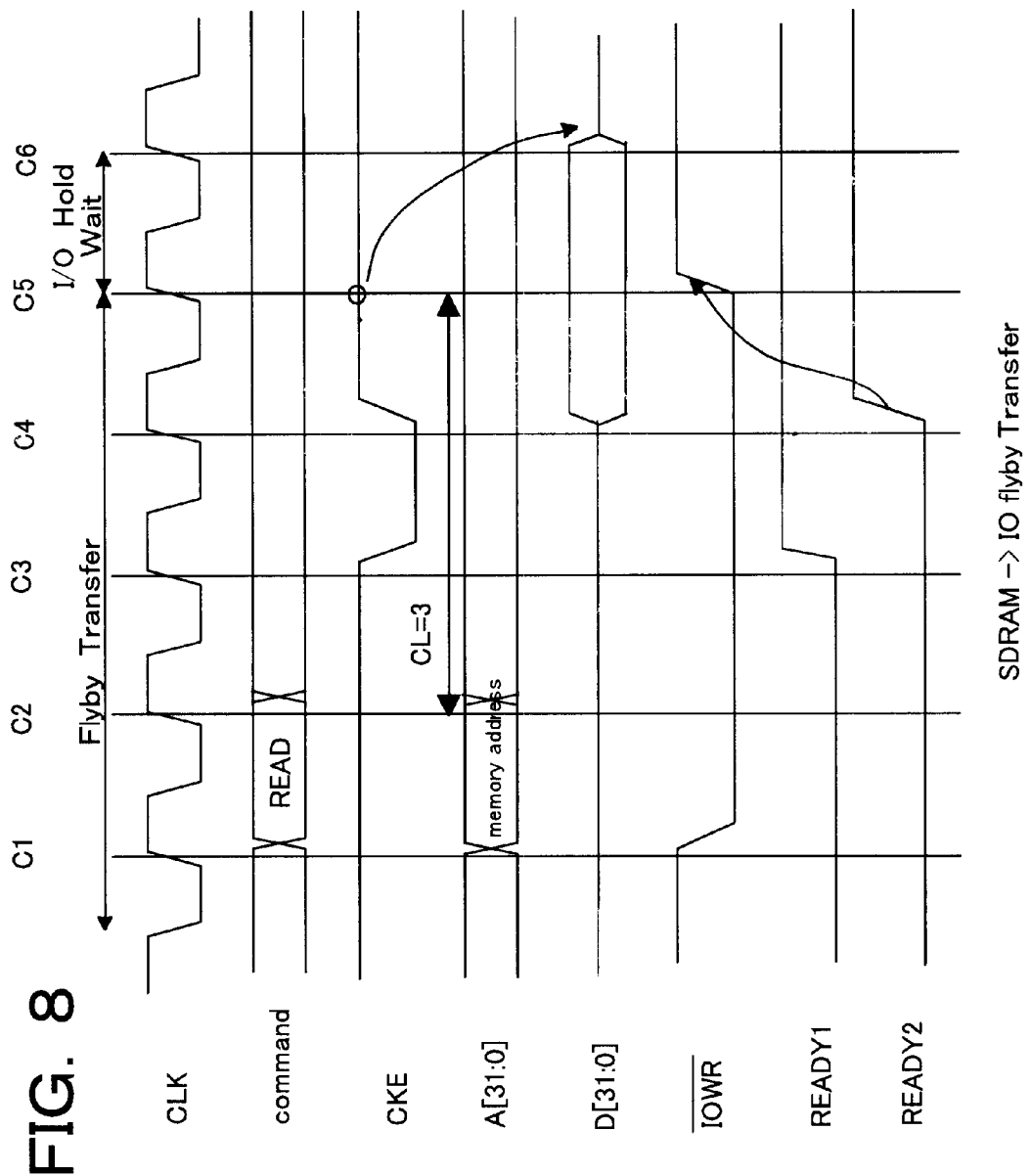
FIG. 8 is a timing chart for flyby transfer from SDRAM to I/O memory according to the present embodiment.

FIG. 8 is a timing chart of flyby transfer from SDRAM to I/O memory relating to the present embodiment. In this example, because the read operation of the SDRAM 24 is long, read data is output for a period of only two clock cycles without extending the read data output as in FIG. 6. Initially, the SDRAM sequencer 140 issues a read command READ at clock cycle C1 in response to a flyby request and the I/O sequencer 180 asserts the I/O write signal /IOWR. At clock cycle C3, when the write setup for the I/O memory 28 is complete, the I/O sequencer 180 asserts the first ready signal READY1. Thereafter, at clock cycle C4 corresponding to CAS latency CL=3, the SDRAM sequencer 140 asserts the second ready signal READY2 to indicate that the read data setup for the SDRAM 24 is complete, whereupon the I/O sequencer 180 negates the I/O write signal /IOWR at clock cycle C5 and causes the I/O memory 28 to write data during the I/O hold period.

Corresponding to CAS latency CL=3, at clock cycle C3 that is one clock before read data output the SDRAM sequencer 140 negates the clock enable CKE, but because the first ready signal READY1 is already asserted, the sequencer 140 asserts the clock enable CKE at clock cycle C4 and effectively outputs the read data D for a period of two clock cycles.

In the example in FIG. 6, the SDRAM sequencer 140 maintains the output of read data for a period of three clock cycles because the I/O memory setup is long, but in the example in FIG. 8, this becomes a period of two clock cycles because the I/O memory setup is short. In the case of FIG. 8, flyby transfer is complete in a smaller number of clock cycles than in the example in FIG. 7.

Flyby Transfer from I/O Memory to SDRAM (I/O Memory is Slower)

Figure 9:
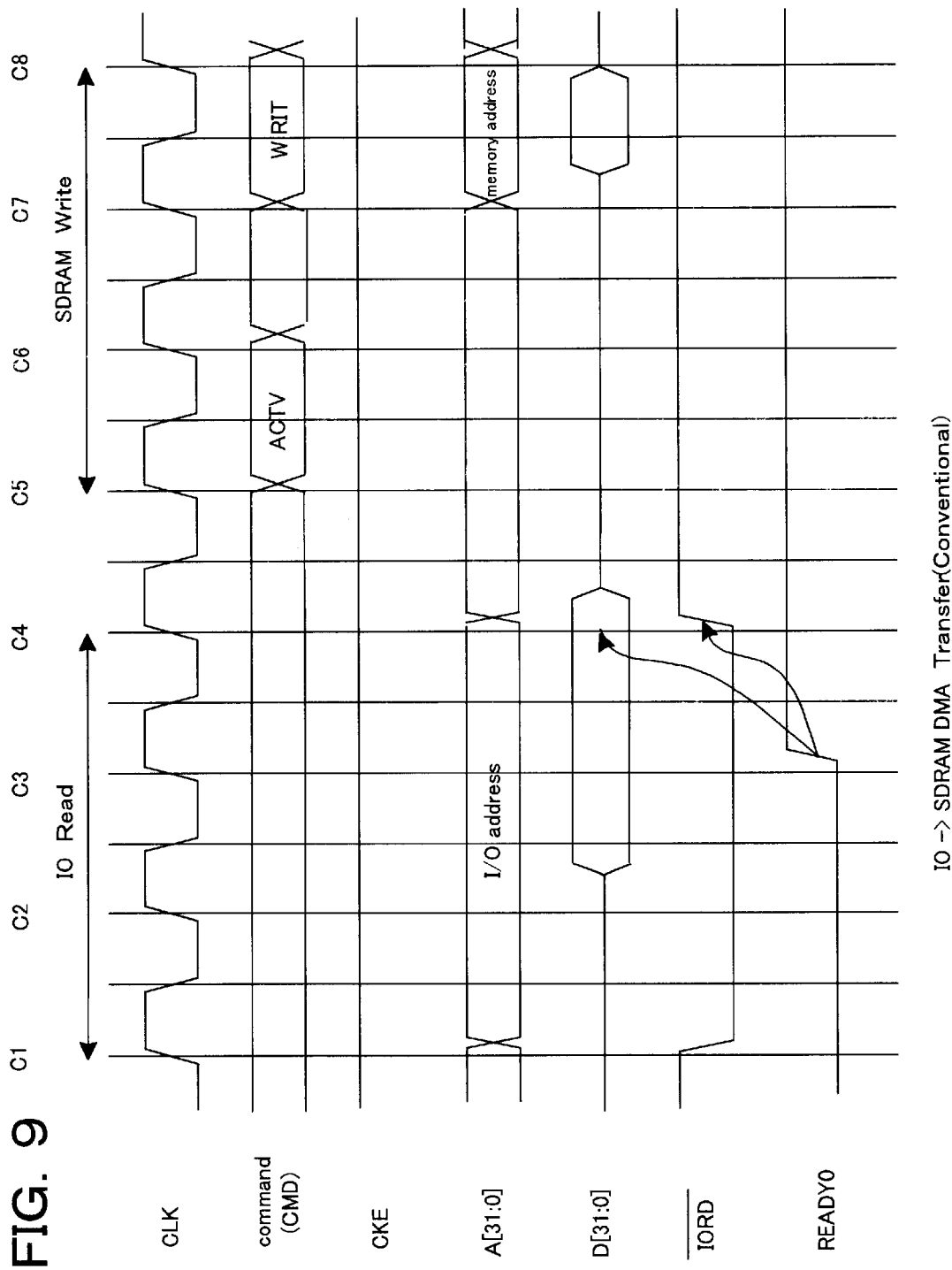
FIG. 9 is a timing chart for conventional transfer operations from I/O memory to SDRAM.

FIG. 9 is a timing chart of a conventional transfer operation from I/O memory to SDRAM. The DMAC 16 sends an I/O read request to the I/O interface 18, and the I/O sequencer 180 reads data from the I/O memory 28 and temporarily stores same in an internal buffer. Next, DMAC 16 sends an SDRAM write operation request to the SDRAM interface 14 and the SDRAM sequencer 140 issues an active command ACTV and write command WRIT to the SDRAM 24 and controls the writing of data. In the example in FIG. 9, since the active operation requires two clock cycles, the write command WRIT is issued at C7, two clock cycles after the issuing of the active command ACTV.

Figure 10:
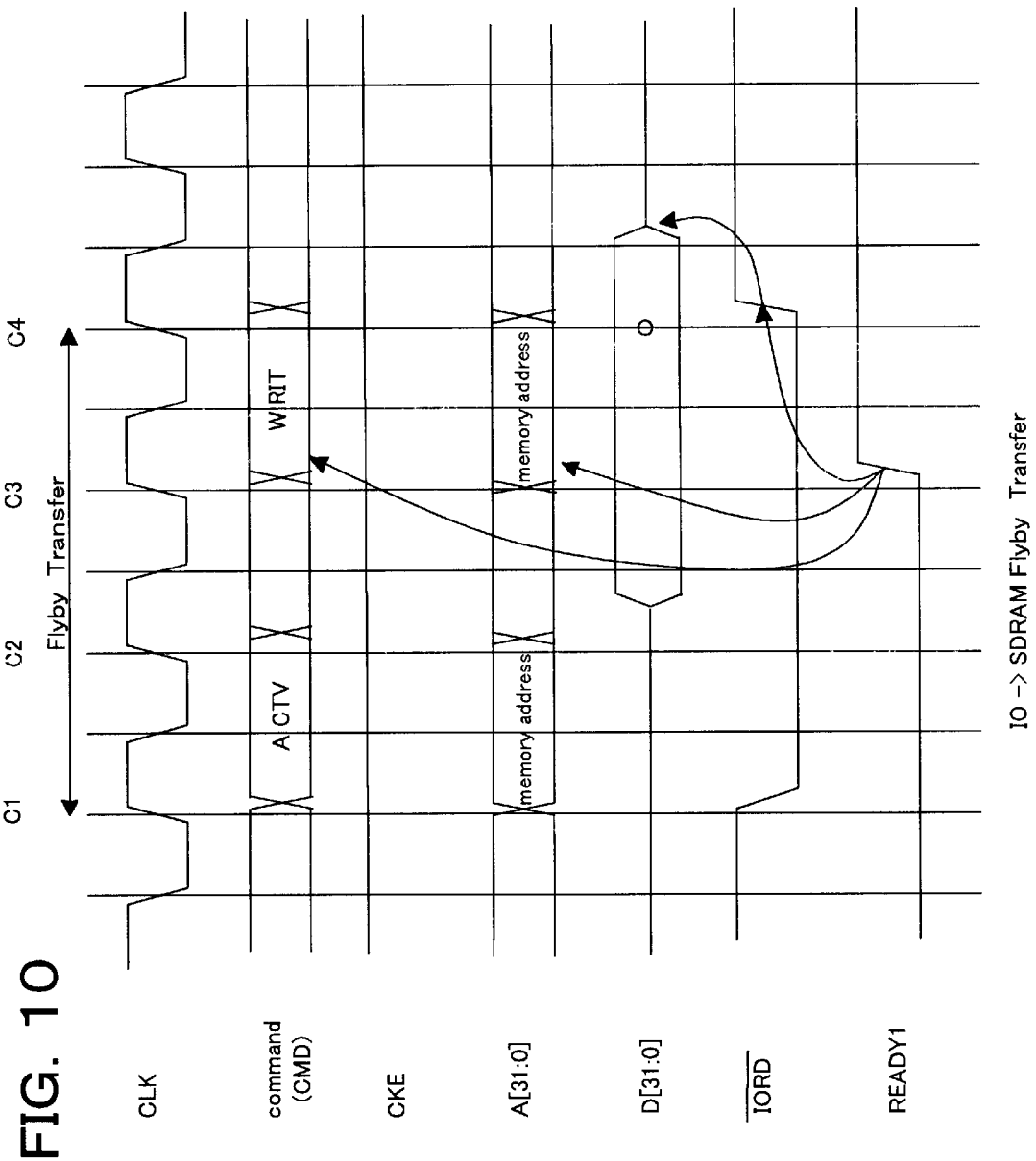
FIG. 10 is a timing chart for flyby transfer from I/O memory to SDRAM according to the present embodiment.

FIG. 10 is a timing chart of flyby transfer from I/O memory to SDRAM relating to the present embodiment. The DMAC 16 issues the flyby signals FLYBYi, FLYBYs and sends a flyby transfer request to both interfaces 18, 14. At clock cycle C1, the I/O sequencer 180 asserts the I/O read signal /IORD and requests a read operation of the I/O memory 28. Also, the SDRAM sequencer 140 starts the write operation transaction from the same cycle C1. In the example in FIG. 10, the active command ACTV is issued and then the write command WRIT is issued.

When the read data output setup is complete, the I/O memory 28 asserts the ready signal READY0 at clock cycle C2 (not shown) and the I/O sequencer 180 asserts the first ready signal READY1 at clock cycle C3. In response to this assertion, the SDRAM sequencer 140 issues the write command WRIT and the SDRAM 24 fetches the read data D on the universal bus and writes to a memory cell at clock cycle C4.

In the case where the SDRAM 24 does not require the active operation ACTV, the SDRAM sequencer 140 can issue the write command WRIT without issuing the active command ACTV at clock cycle C1. Even in that case, however, the first ready signal READY1, that indicates that I/O memory 28 setup is complete, is not asserted, and therefore the write command WRIT is not issued; the issuing of the write command is waited until clock cycle C3.

In this case also, the flyby transfer operation is completed in fewer clock cycles than in the example in FIG. 9.

Flyby Transfer from I/O Memory to SDRAM (SDRAM is Slower)

Figure 11:
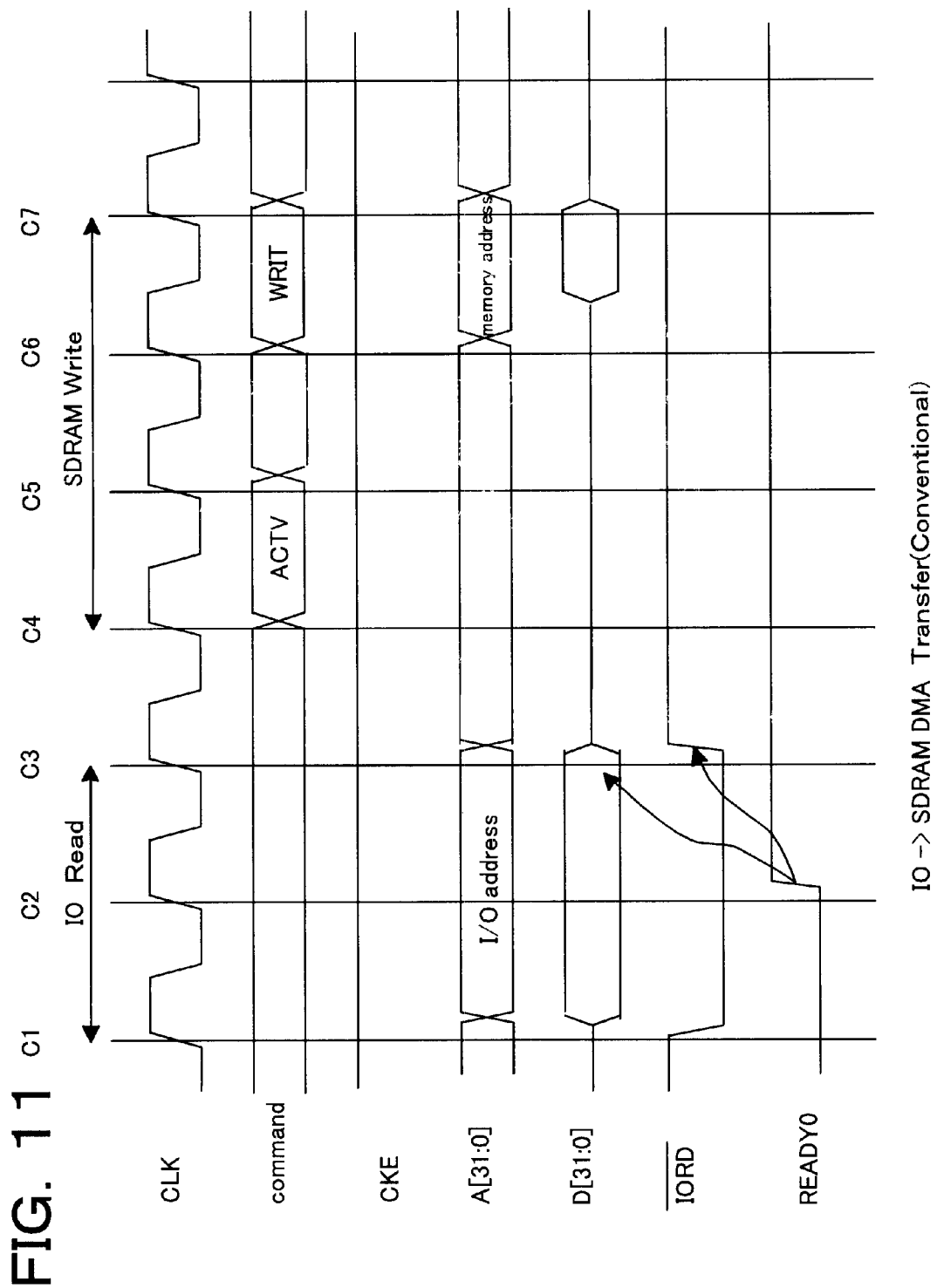
FIG. 11 is a timing chart for conventional transfer operations from I/O memory to SDRAM.

FIG. 11 is a timing chart of a conventional transfer operation from I/O memory to SDRAM. With the same operations as in FIG. 9, the SDRAM 24 writes data after reading same from the I/O memory 28. In the example in FIG. 11, however, the IO read operation of the I/O memory takes two clock cycles and is shorter compared with that of FIG. 9.

Figure 12:
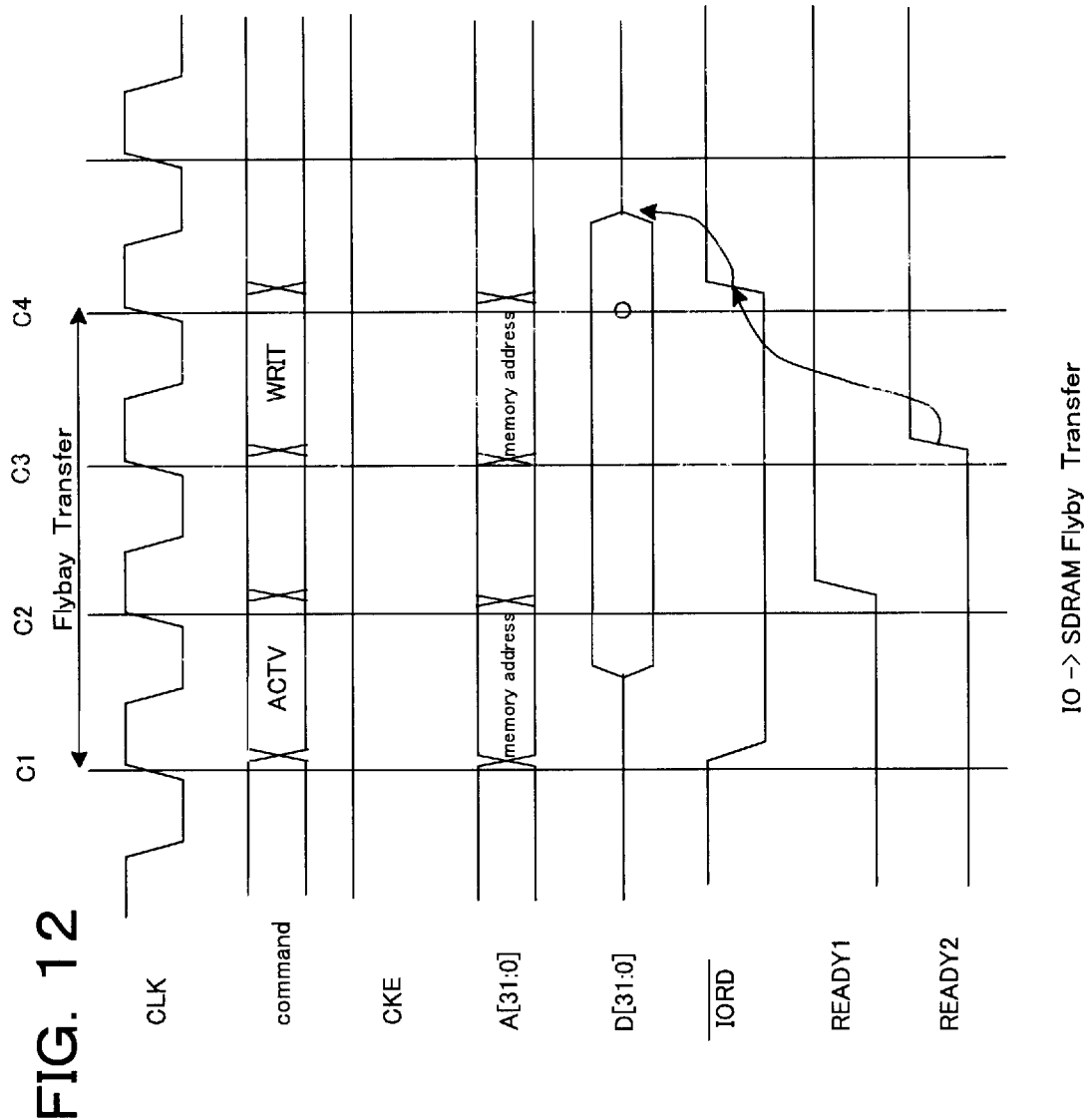
FIG. 12 is a timing chart for flyby transfer from I/O memory to SDRAM according to the present embodiment.

FIG. 12 is a timing chart of flyby transfer from I/O memory to SDRAM relating to the present embodiment. In this example, the read operation in I/O memory 28 is complete in one clock cycle and the first ready signal READY1 is already asserted at clock cycle C2. Consequently, the SDRAM sequencer 140 issues the active command ACTV and write command WRIT in order and asserts the second ready signal READY2 at the same time as issuing the write command. As a result, data is written to the SDRAM 24 at clock cycle C4 and the I/O sequencer 180 negates the I/O read signal /IORD thereafter. Since the operation of the SDRAM is slow in this example, the period during which the I/O memory 28 outputs read data is three clock cycles, longer than the two clock cycles in the case of FIG. 10.

Burst Transfer

Figure 13:
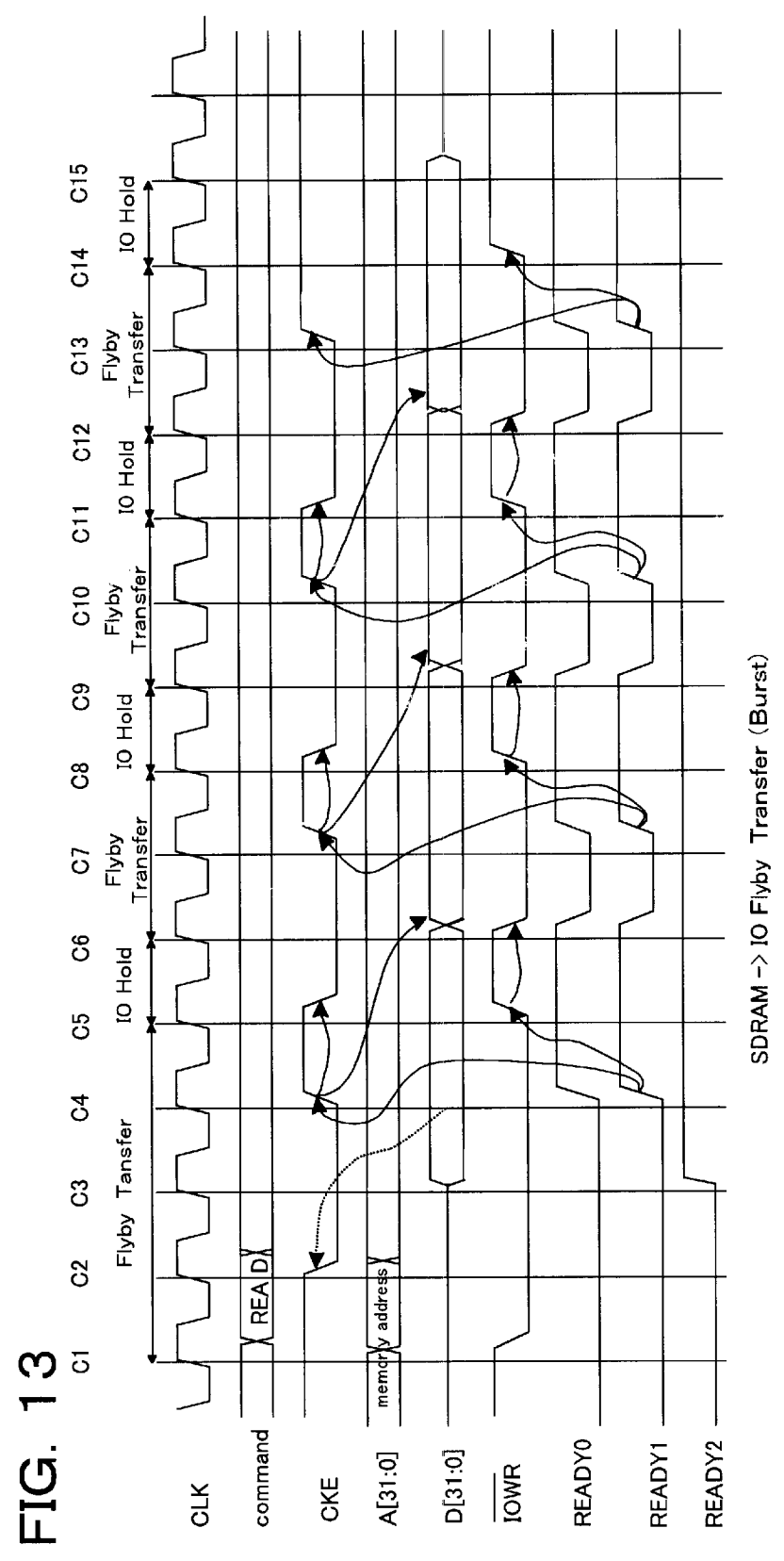

FIG. 13 is a timing chart of burst transfer using flyby transfer from SDRAM to I/O memory relating to the present embodiment. This example is an operation with a burst length of 4, in the case where the CAS latency CL of the SDRAM 24 is short, 2, and the I/O memory 28 is slow and requires an I/O hold period of one clock cycle after the negation of the I/O write command /IOWR. Also, the I/O sequencer 180 and SDRAM sequencer 140 indicate that setup is complete in each case by transmitting the first and second ready signals. Moreover, burst transfer includes a flyby request signal, for example, and a request for burst transfer is sent to each interface from the DMAC.

In response to a flyby transfer request, not shown, the SDRAM sequencer 140 issues a read command READ at clock cycle C1 and the I/O sequencer 180 asserts the I/O write signal /IOWR. Since the CAS latency is CL=2, the SDRAM sequencer 140 asserts the second ready signal READY2 at clock cycle C3 to indicate that the read data setup is prepared. Also, the SDRAM sequencer 140 negates the clock enable CKE at clock cycle C2, which is one clock cycle before data output, and waits to receive the first ready signal READY1.

When the I/O memory write setup is prepared at clock cycle C4, the ready signal READY0 is asserted and at the same time the I/O sequencer 180 asserts the first ready signal READY1. In response thereto, the SDRAM sequencer 140 asserts the clock enable CKE and performs the next read data output control. Also, the I/O sequencer 180 negates the I/O write signal /IOWR at clock cycle C5.

In burst mode also, the SDRAM sequencer must maintain read data output until the first ready signal READY1, which indicates that I/O memory setup is prepared, is asserted. Consequently, the SDRAM sequencer 140 immediately negates the clock enable CKE at clock cycle C5 and waits for the first ready signal READY1.

Once the I/O hold period ends at clock cycle C5 is complete, the I/O sequencer 180 asserts the I/O write signal /IOWR at clock cycle C6 in order to write the next data. Because the SDRAM 24 already has the output setup prepared for burst mode for the second read data output, the second ready signal READY2 remains asserted. Once the setup for the I/O memory 28 is prepared, the I/O sequencer 180 asserts the first ready signal READY1 at clock cycle C7. In response thereto, the SDRAM sequencer 140 also asserts the clock enable CKE and carries out the next read data output control.

The third and fourth data flyby transfers are the same as the abovementioned second data flyby transfer. In effect, at clock cycle C3, two clock cycles corresponding to CAS latency CL=2 after issuing the read command READ, the SDRAM sequencer 140 asserts the second ready signal READY2 and then maintains that asserted state. The SDRAM sequencer 140 negates the clock enable CKE at each time to maintain read data output, and then waits for the first ready signal READY1 from the I/O sequencer 180 to assert the clock enable CKE, so that the SDRAM sequencer performs control of the next read data output. Therefore, the SDRAM sequencer 140 can even handle flyby transfer in burst mode by using the clock enable CKE.

Figure 14:
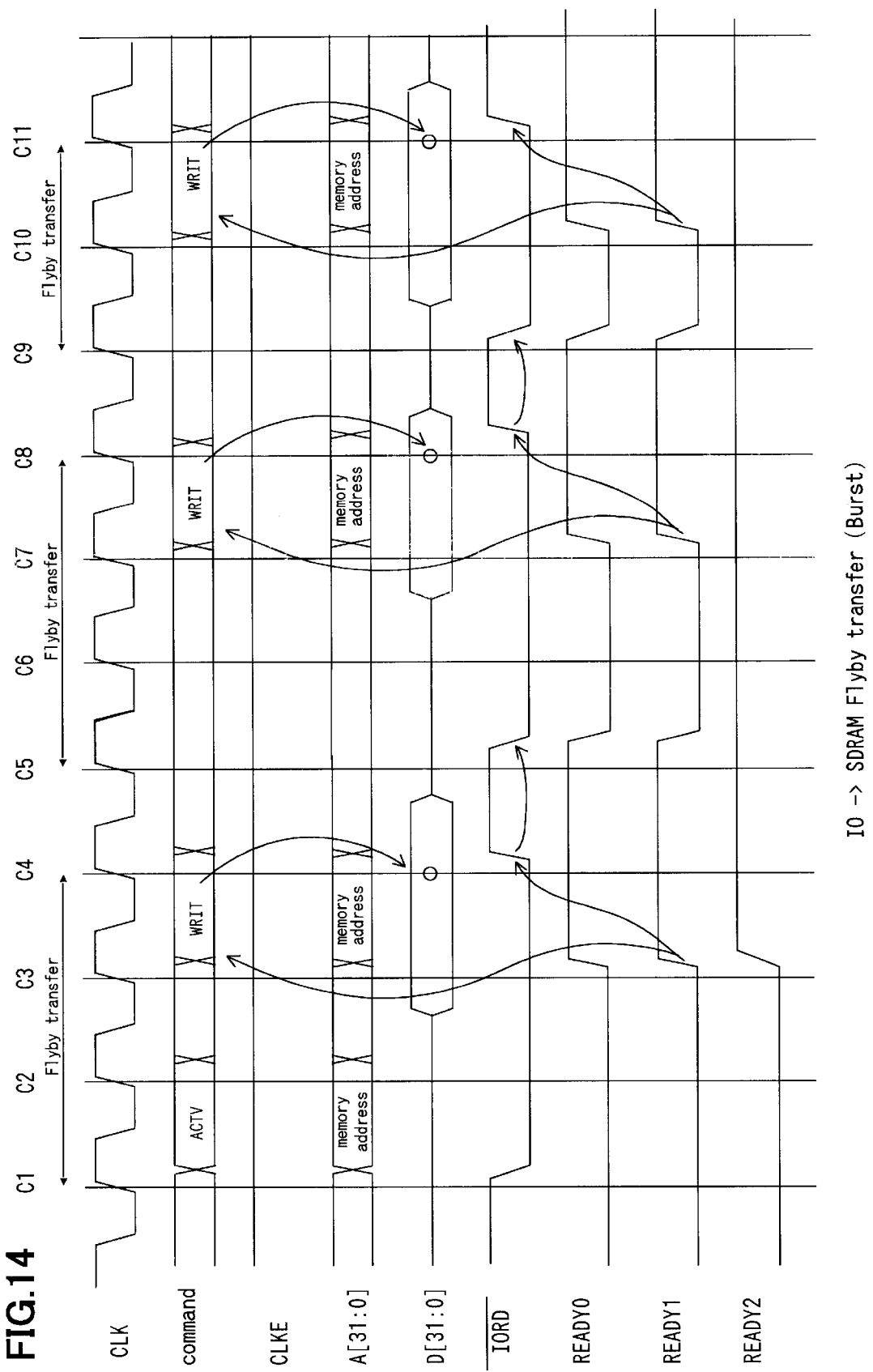
FIG. 14 is a timing chart for burst transfer using flyby transfer from I/O memory to SDRAM, according to the present embodiment.

FIG. 14 is a timing chart for burst transfer using flyby transfer from the I/O memory to SDRAM relating to the present embodiment. This example concerns the case of burst transfer of three data.

In response to a request for flyby transfer, not shown, the SDRAM sequencer 140 issues the active command ACTV at clock cycle C1 for a write operation, asserts the second ready signal READY2 indicating the completion of write setup at clock cycle C3, and waits for the first ready signal READY1. However, in the example in FIG. 14, the read output setup of the I/O memory 28 is completed at the same time and the first ready signal READY1 is asserted at clock cycle C3. In response thereto, the SDRAM sequencer 140 issues the write command WRIT. At the same time that the write command is issued, the read data on the universal bus are written to the SDRAM 24 at C4.

Consequently, in the case where the SDRAM 24 does not require the active operation, the second ready signal READY2 is asserted sooner than in FIG. 14. However, in this case also, the issuing of the write command WRIT is not performed until the first ready signal READY1 is asserted.

When the write operation for the initial data is performed, the I/O sequencer 180 asserts the I/O read signal /IORD once more, at clock cycle C5, to output the next data. At this time, because the SDRAM 24 is in a writable state, the second ready signal READY2 remains asserted. Once the setup for the next data output is prepared in the I/O memory 28, the first ready signal READY1 is asserted at clock cycle C7, the SDRAM sequencer 140 issues the write command WRIT, and causes a write operation to the SDRAM 24.

The operations for the next data are the same as the flyby transfer for the second data. In this way, with burst transfer in flyby transfer from I/O memory to SDRAM, subsequent writing of data can be performed promptly with the issuing of a write command once the initial write setup is prepared for the SDRAM 24. Consequently, the SDRAM sequencer 140 may simply continue to wait for the first ready signal READY1 and then issue the write command WRIT. In effect, this is burst transfer, but the SDRAM sequencer 140 only repeats single write control, rather than burst write control, for the burst length.

Modified Example

Figure 15:
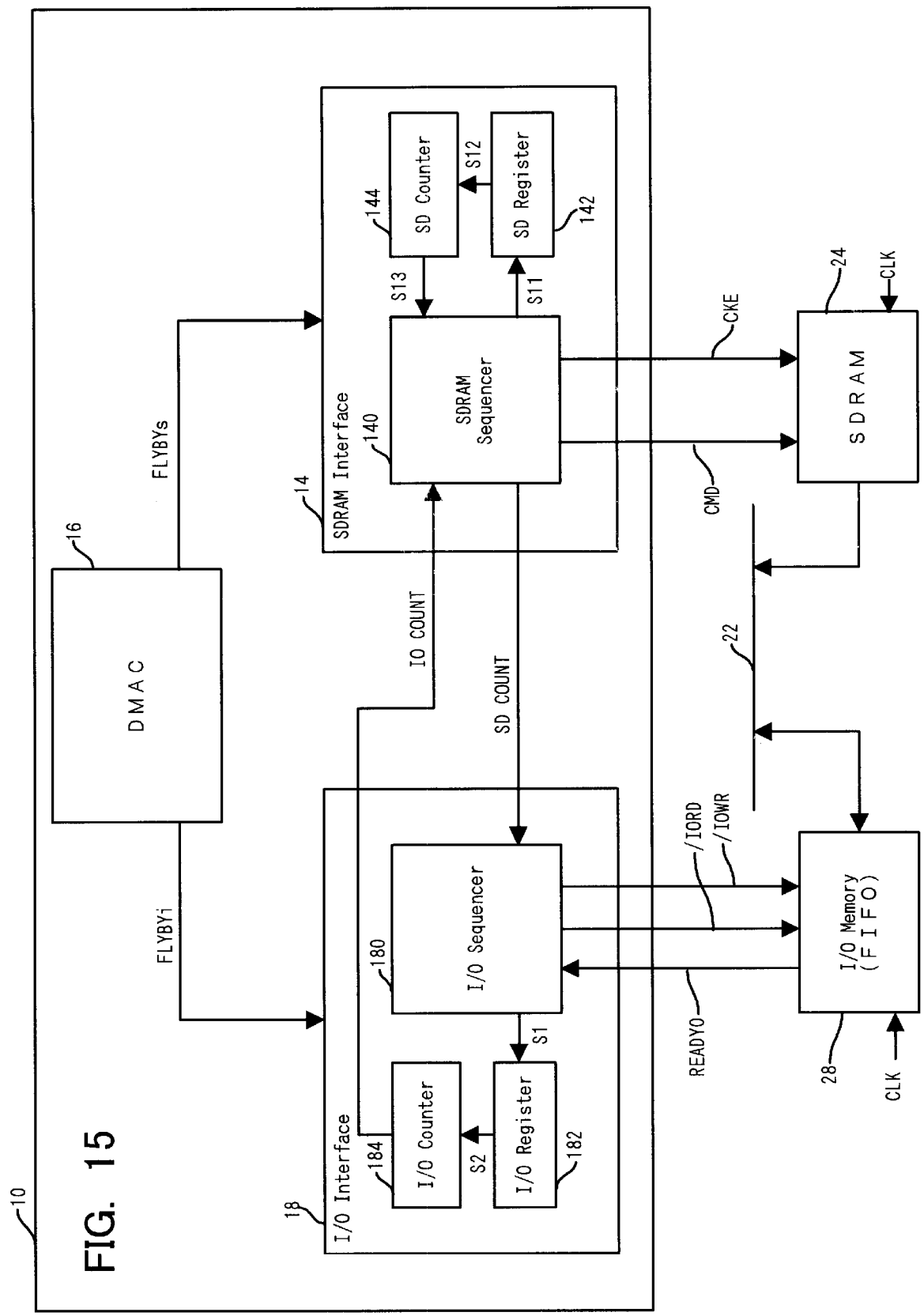
FIG. 15 is a diagram of the configuration of a modified example of the DMA control system relating to the present embodiment.

FIG. 15 is a diagram of the configuration of a modified example of the DMA control system relating to the present embodiment. The same reference numbers are used for portions that are the same as in FIG. 2. The configuration differs from FIG. 2 as follows: the count value IOCOUNT of the I/O counter 184 in the I/O interface 18 is supplied to the SDRAM sequencer 140 side instead of receiving a first ready signal, the SDRAM sequencer 140 monitors the I/O count value IOCOUNT and detects whether I/O memory setup is prepared. Likewise, instead of receiving the second ready signal READY2 from the SDRAM sequencer 140, the I/O sequencer 180 receives the count value SDCOUNT until the read or write operation setup is prepared. The SDRAM sequencer 140 counts down the counter 144 to manage the number of clock cycles necessary for each type of operation of the SDRAM 24. The SDRAM sequencer 140 converts from that count value S13 to the number of clock cycles SDCOUNT until the read or write setup is prepared and thus supplies SDCOUNT to the I/O sequencer 180.

Consequently, in the DMA control system in FIG. 15, the completion of the SDRAM setup is determined according to the SDRAM count value SDCOUNT in the course of the process S24 in the flowchart of the I/O sequencer operations shown in FIG. 3. Furthermore, the completion of the I/O memory setup is determined according to the I/O count value IOCOUNT in the course of the processes S48, S58 in the flowchart of the SDRAM sequencer operations shown in FIG. 4.

Figure 16:
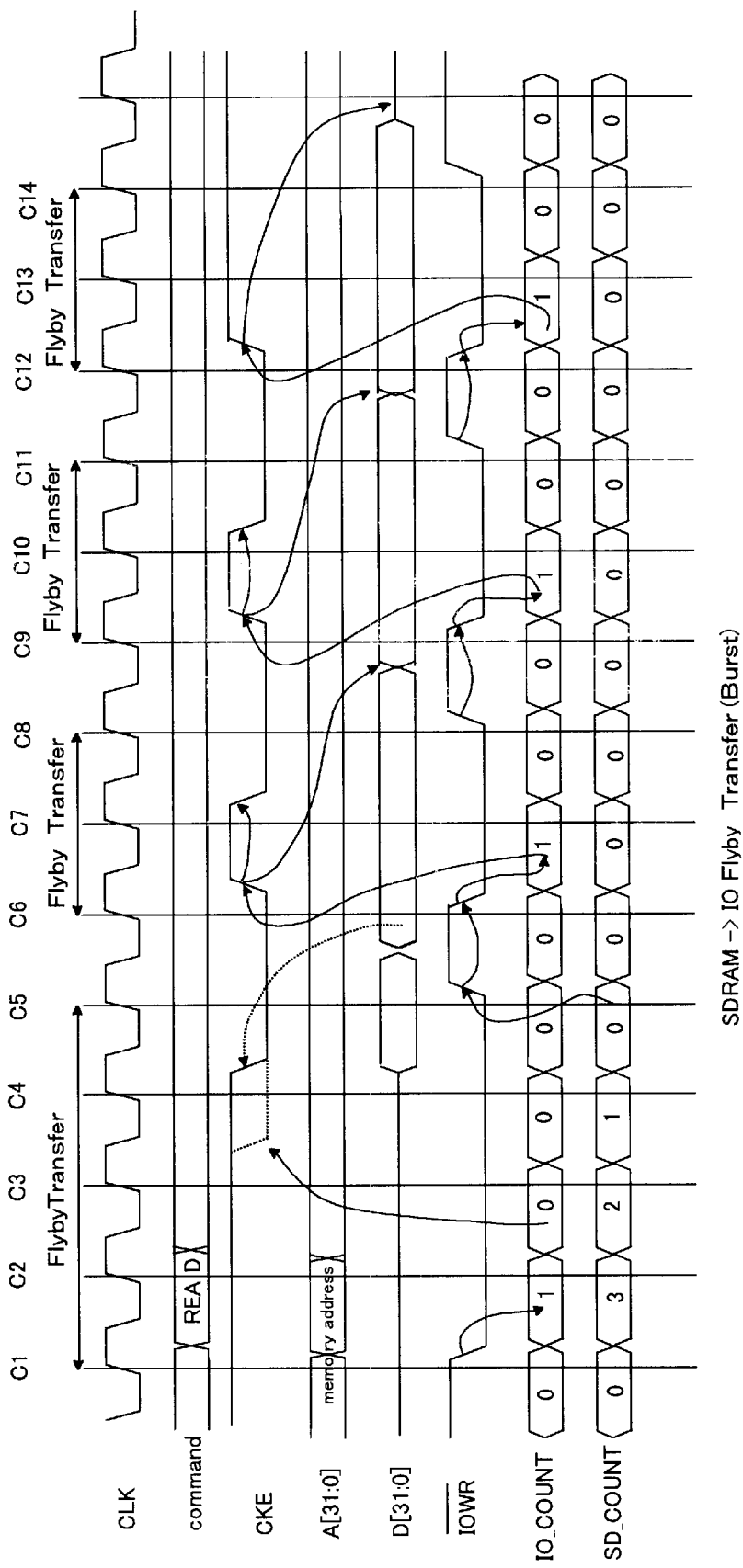
FIG. 16 is a timing chart for burst transfer operations in flyby transfer from SDRAM to I/O memory using the system of the modified example.

FIG. 16 is a timing chart of the burst transfer operation with flyby transfer from SDRAM to I/O memory according to the system in the abovementioned modified example. In this example, CAS latency CL is 3 and the I/O memory engages in high-speed operations that do not require the I/O hold. As shown, the I/O count value IOCOUNT and SDRAM count value SDCOUNT are monitored instead of the first and second ready signals. As in FIG. 13, the output of the read data D in the SDRAM 24 is held by the negation of the clock enable CKE; The clock enable CKE is asserted by predicting the cycle at which the write operation is completed in the I/O memory according to the change in the I/O count value so that the next read data is output.

In response to a flyby transfer request, not shown, the SDRAM sequencer 140 issues the read command READ at clock cycle C1 and supplies to the I/O sequencer 180, the number of clock cycles "3", showing cycles until read data is output, as the SDRAM count value S144. When it is necessary for the, SDRAM 24 to execute from active operation, this SDRAM count value SDCOUNT becomes a value that is equal to the CAS latency added to the clock cycle for active operation. Also, the I/O sequencer 180 supplies to the SDRAM sequencer 140 the number of clock cycles "1" showing cycles until the write operation setup is prepared, as the I/O count value IOCOUNT.

Because the I/O count value IOCOUNT becomes "0" at clock cycle C2, the SDRAM sequencer 140 detects that I/O memory setup is complete and does not negate the clock enable CKE even if this is one clock cycle before the output of the read data D. Then, the sequencer 140 negates the clock enable CKE at clock cycle C4 in order to hold the next read data output.

The I/O sequencer 180 detects the completion of the writing of the effective read data when the SDRAM count value SDCOUNT becomes "0", temporarily negates the I/O write signal /IOWR at clock cycle C5, and then asserts that signal once more at the next clock cycle C6. Accordingly, the I/O memory starts write setup for the next flyby transfer. The I/O sequencer sets the I/O count value IOCOUNT to "1" with the assertion of the I/O write signal /IOWR at clock cycle C6. The SDRAM sequencer sees this I/O count value and detects that the I/O memory setup for writing the second data is prepared after one clock cycle. The sequencer 140 asserts the clock enable CKE in order to output the third read data. At the next clock cycle C7 following the assertion of the clock enable CKE, the clock enable CKE is negated and the SDRAM is controlled so as to hold the third read data.

Subsequent to clock cycle C5, the SDRAM is set up for read data output and therefore that count value SDCOUNT remains "0". Consequently, control of the second and subsequent read data by the SDRAM sequencer 140 is based on the I/O count value IOCOUNT and is controlled by the negation and assertion of the clock enable CKE.

FIG. 17 is a timing chart of the burst transfer operation with flyby transfer from I/O memory to SDRAM according to the system in the abovementioned modified example. In this example, the SDRAM sequencer supplies a burst write instruction to the SDRAM, delays the time of the write operation by negating the clock enable CKE, monitors the time at which the read data in I/O memory becomes effective according to the I/O count value IOCOUNT, asserts the clock enable CKE and gives an instruction for the write operation.

Initially, when flyby transfer is ordered at clock cycle C1, the SDRAM sequencer 140 issues the active command ACTV and sets the SDRAM count value SDCOUNT to "3". Meanwhile, the I/O sequencer 180 asserts the I/O read command /IORD and sets the I/O count value IOCOUNT to "1". In the initial data flyby transfer, the read data setup of I/O memory is prepared first. Accordingly, the SDRAM sequencer can issue a write command at the shortest clock cycle C4 and the data is written at clock cycle C5. At that time, the SDRAM sequencer 140 issues the write command WRIT, while negating the clock enable CKE and controls the next data writing in a hold state.

In response to the SDRAM count value SDCOUNT becoming "0", the I/O sequencer 180 negates the I/O read command /IORD at clock cycle C5 and asserts the command once more at the next cycle C6. At this assertion, the I/O count value IOCOUNT is set to "1". In response thereto, the SDRAM sequencer 140 asserts the clock enable CKE and controls the writing operation in clock cycle C8. The SDRAM sequencer 140 negates the asserted clock enable CKE once more at the next cycle C7 and controls the third data writing operation in a hold state.

Subsequently, the SDRAM 24 remains in a writable state and therefore the SDRAM sequencer 140 maintains the SDRAM count value SDCOUNT at "0" and then asserts and negates the clock enable CKE for a period of one clock cycle once the I/O count value IOCOUNT is set to "1". The I/O count value IOCOUNT is set to "1" by the I/O sequencer 180 at the assertion of the I/O read command /IORD to start the read data setup of the I/O memory.

As above, the SDRAM sequencer and I/O sequencer provide each other with the number of clock cycles showing cycles until setup is complete as count values, and thereby allow the other to make predictions according to that count value and control the corresponding controlling device. In the case of the burst transfer discussed above, the SDRAM sequencer regulates the timing for writing a plurality of data by toggling the clock enable CKE during burst write control and makes possible flyby transfer.

As above, the present invention makes it possible to perform data transfer directly via a universal bus between synchronous memory and input/output memory.

What is claimed is:

1. A direct memory access control system for synchronous memory and input/output memory connected via a bus, comprising:

a direct memory access controller for issuing a flyby transfer command ordering transfer of data via said bus between said synchronous memory and input/output memory;

a memory interface for receiving said flyby transfer command and supplying a first access command to said synchronous memory; and an input/output interface for receiving said flyby transfer command and supplying a second access command to said input/output memory;

wherein said input/output interface supplies a first status signal to said memory interface, said first status indicating a writable timing of said input/output memory during a first flyby transfer from said synchronous memory to said input/output memory and indicating a read data effective timing of said input/output memory during a second flyby transfer from said input/output memory to said synchronous memory;

wherein said memory interface supplies a second status signal to said input/output interface, said second status signal indicating a read data effective timing of said synchronous memory during said first flyby transfer and indicating a writable timing of said synchronous memory during said second flyby transfer; and wherein until whichever timing is later of said respective timings according to said first and second status signals, said input/output interface and said memory interface maintain the writable state and the read data effective state respectively during said first flyby transfer and maintain the read data effective state and the writable state respectively during said second flyby transfer.

2. The direct memory access control system, according to claim 1, wherein during flyby transfer from said synchronous memory to input/output memory, said memory interface negates a clock enable signal controlling clock input to said synchronous memory to maintain said read data effective state, and maintains said read data effective state until the timing indicated by said first status signal.

3. The direct memory access control system, according to claim 1, wherein said first and second status signals include first and second ready signals asserted at the read data effective timing or writable timing respectively; and wherein during flyby transfer from said synchronous memory to input/output memory, said memory interface negates a clock enable signal controlling clock input to said synchronous memory to maintain said read data effective state, and maintains said read data effective state until an assertion of said first ready signal.

4. The direct memory access control system, according to claim 1, wherein said first and second status signals include signals corresponding to first and second count values indicating the number of clock cycles until the read data effective timing or writable timing, respectively; and wherein during flyby transfer from said synchronous memory to input/output memory, said memory interface negates a clock enable signal controlling clock input to said synchronous memory to maintain said read data effective state, and maintains said read data effective state according to said first count value.

5. The direct memory access control system, according to claim 1, wherein said memory interface asserts said clock enable signal at the timing indicated by said first status signal and ends said read data effective state after the clock enable signal assertion.

6. The direct memory access control system, according to claim 5, wherein, in the case where said input/output memory requires a data hold period for writing data, said memory interface asserts said clock enable signal and ends said read data effective state after the end of said data hold period.

7. The direct memory access control system, according to claim 1, wherein, during flyby transfer from said synchronous memory to input/output memory, said input/output interface asserts an input/output write signal ordering writing to said input/output memory and maintains the assertion of said input/output write signal until the timing indicated by said second status signal.

8. The direct memory access control system, according to claim 1, wherein said first and second status signals include first and second ready signals asserted at the read data effective timing and writable timing respectively; and during flyby transfer from said synchronous memory to input/output memory, said input/output interface asserts an input/output write signal ordering writing to said input/output memory and maintains the assertion of said input/output write signal until an assertion of said second ready signal.

9. The direct memory access control system, according to claim 1, wherein said first and second status signals include first and second count values indicating the number of clock cycles until the read data effective timing and writable timing respectively; and during flyby transfer from said synchronous memory to input/output memory, said input/output interface asserts an input/output write signal ordering writing to said input/output memory and maintains the assertion of said input/output write signal until the timing corresponding to said second count value.

10. The direct memory access control system, according to claim 1, wherein said memory interface issues a write command to said synchronous memory at the time indicated by said first status signal during flyby transfer from said input/output memory to synchronous memory.

11. The direct memory access control system, according to claim 1, wherein said first and second status signals include first and second ready signals asserted at the read data effective timing and writable timing respectively; and during flyby transfer from said input/output memory to synchronous memory, said memory interface issues a write command to said synchronous memory in response to an assertion of said first ready signal.

12. The direct memory access control system, according to claim 1, wherein said first and second status signals include first and second count values indicating the number of clock cycles until the read data effective timing and writable timing respectively; and during flyby transfer from said input/output memory to synchronous memory, said memory interface issues a write command to said synchronous memory at a timing corresponding to said first count value.

13. The direct memory access control system, according to claim 1, wherein said input/output interface asserts an input/output read signal ordering reading to said input/output memory and maintains the assertion of said input/output read signal until the time indicated by said second status signal.

14. The direct memory access control system, according to claim 1, wherein said first and second status signals include first and second ready signals asserted at the read data effective timing and writable timing respectively; and during flyby transfer from said input/output memory to synchronous memory, said input/output interface asserts an input/output read signal ordering reading to said input/output memory and maintains the assertion of said input/output read signal until an assertion of said second ready signal.

15. The direct memory access control system, according to claim 1, wherein said first and second status signals include first and second count values indicating the number of clock cycles until the read data effective timing and writable timing respectively; and during flyby transfer from said input/output memory to synchronous memory, said input/output interface asserts an input/output read signal ordering reading to said input/output memory and maintains the assertion of said input/output read signal until the timing corresponding to said second count value.

16. The direct memory access control system, according to claim 1, wherein said synchronous memory comprises a synchronous dynamic random access memory.

17. The direct memory access control system, according to claim 2, wherein, during successive flyby transfer of a plurality of data from said synchronous memory to input/output memory, said memory interface commands burst reading as said first access command and negates said clock enable signal for a second and subsequent outputs of read data to maintain said read data effective state, and said memory interface asserts said clock enable signal at the timing indicated by said first status signal to make effective the next read data output.

18. The direct memory access control system, according to claim 10, wherein, during successive flyby transfer of a plurality of data from said input/output memory to synchronous memory, said memory interface commands burst writing as said first access command and negates said clock enable signal for a second and subsequent inputs of write data to hold said write data input, and said memory interface asserts said clock enable signal at the time indicated by said first status signal to make effective the next write data input.

19. A direct memory access control system for synchronous memory and input/output memory connected via a bus, comprising:

a memory interface for receiving a flyby transfer command ordering transfer of data via said bus between said synchronous memory and input/output memory, and supplying a first access command to said synchronous memory; and an input/output interface for receiving said flyby transfer command and supplying a second access command to said input/output memory;

wherein said input/output interface supplies a first status signal for indicating a timing when said input/output memory completes an input/output setup, to said memory interface;

wherein said memory interface supplies a second status signal, for indicating a timing when said synchronous memory completes an input/output setup, to said input/output interface; and wherein, said memory interface and input/output interface maintain the completed input/output setup state of said synchronous memory and input/output memory, respectively, until whichever timing is later of said timing according to said first and second status signals.

20. The direct memory access control system, according to claim 19, wherein said memory interface negates a clock enable signal controlling an input of a clock to said synchronous memory to extend said completed input/output setup state, and asserts said clock enable signal at the timing indicated by said first status signal, to complete said completed input/output setup state.

* * * * *